United States Patent
Watanabe et al.

(10) Patent No.: US 9,491,823 B2
(45) Date of Patent: Nov. 8, 2016

(54) LIGHTING DEVICE, LIGHTING FIXTURE AND LIGHTING SYSTEM

(71) Applicant: Panasonic Intellectual Property Management Co., Ltd., Osaka (JP)

(72) Inventors: Koji Watanabe, Kyoto (JP); Yoshikazu Kado, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/996,347

(22) Filed: Jan. 15, 2016

(65) Prior Publication Data
US 2016/0212815 A1 Jul. 21, 2016

(30) Foreign Application Priority Data

Jan. 19, 2015 (JP) ................................. 2015-008004

(51) Int. Cl.
*H05B 33/08* (2006.01)

(52) U.S. Cl.
CPC ...... *H05B 33/0845* (2013.01); *H05B 33/0815* (2013.01); *H05B 33/0818* (2013.01); *H05B 33/0851* (2013.01); *H05B 33/0896* (2013.01)

(58) Field of Classification Search
CPC .......... H05B 33/0818; H05B 33/0815; H05B 33/0845; H05B 33/0896; H05B 37/02; H05B 33/0848; H05B 33/0821; H05B 33/0827; H05B 33/0833; H05B 33/0839; Y02B 20/346; H02M 2001/0035; H02M 3/33569

See application file for complete search history.

(56) References Cited

U.S. PATENT DOCUMENTS

| | | | | |
|---|---|---|---|---|
| 5,821,699 A * | 10/1998 | Moisin | ............... | H05B 41/28 315/224 |
| 8,339,067 B2 * | 12/2012 | Lin | ............... | H05B 33/0818 315/291 |
| 8,680,788 B2 * | 3/2014 | Esaki | ............... | H05B 33/0848 315/209 R |
| 8,823,275 B2 * | 9/2014 | Okawa | ............... | H05B 33/0896 315/209 R |
| 9,167,654 B2 * | 10/2015 | Watanabe | ............... | H05B 33/0815 |
| 2010/0219764 A1 | 9/2010 | Yamasaki et al. | | |
| 2013/0099691 A1 * | 4/2013 | Esaki | ............... | H05B 33/0815 315/210 |
| 2013/0141017 A1 | 6/2013 | Esaki et al. | | |
| 2014/0176015 A1 | 6/2014 | Suzuki | | |

FOREIGN PATENT DOCUMENTS

| | | |
|---|---|---|
| JP | 2009-123681 A | 6/2009 |
| JP | 2013-004413 A | 1/2013 |
| JP | 2013-004478 A | 1/2013 |
| JP | 2013-118134 A | 6/2013 |
| JP | 2014-123448 A | 7/2014 |

\* cited by examiner

*Primary Examiner* — Vibol Tan
(74) *Attorney, Agent, or Firm* — Renner, Otto, Boisselle & Sklar, LLP (57) ABSTRACT

A lighting device includes an electricity storage electrically connected in parallel with a solid light source, a switching circuit that produces a current to supply the current to the electricity storage, and a control circuit that controls, according to a dimming level, burst dimming by controlling the switching circuit so that the solid light source is lit intermittently. When the dimming level is a threshold level or more, the control circuit sets an electricity storage capacity of the electricity storage to a first capacity, and sets a frequency by the burst dimming to a first frequency. When the dimming level is below the threshold level, the control circuit sets the electricity storage capacity to a second capacity smaller than the first capacity, and sets the frequency by the burst dimming to a second frequency higher than the first frequency.

12 Claims, 8 Drawing Sheets

LIGHTING DEVICE, LIGHTING FIXTURE AND LIGHTING SYSTEM

CROSS REFERENCE TO RELATED APPLICATIONS

This application claims the benefit and priority of Japanese Patent Application No. 2015-008004, filed on Jan. 19, 2015, the entire contents of which are incorporated herein by reference.

TECHNICAL FIELD

The disclosure relates generally to lighting devices, lighting fixtures and lighting systems and, more particularly, to a lighting device configured to light a solid light source, and a lighting fixture and a lighting system, including the same.

BACKGROUND ART

In recent years, solid light sources such as LEDs (Light Emitting Diodes) are utilized for lighting. This sort of solid light source can be lit with a lighting device.

An LED dimmer known as such a lighting device includes a current adjusting means, a switch means and a dimming control means (for example, JP Pub. No. 2009-123681 (hereinafter, referred to as "Document 1")). The current adjusting means adjusts a current amount with respect to an LED load. The switch means operates to cause a (an electric) current to intermittently flow through the LED load. The dimming control means controls the current adjusting means and the switch means.

The LED dimmer of Document 1 has a dimming function that receives a dimming signal from a dimmer controller to adjust a light output (an optical output) of the LED load. When the dimming signal represents a level corresponding to brightness higher than a predetermined level (a high brightness side), the LED dimmer changes a current flowing through the LED load to a continuous current. In the case of the high brightness side, the LED dimmer adjusts the light output of the LED load by changing the current amount with respect to the LED load. When the dimming signal represents a level corresponding to brightness lower than the predetermined level (a low brightness side), the LED dimmer changes the current flowing through the LED load to a pulsed current. In the case of the low brightness side, the LED dimmer adjusts the light output of the LED load by changing a mean value of the pulsed current waveform.

This sort of lighting device requires adjusting a light output of its own solid light source at a lower luminous flux. Thus, the LED dimmer described above needs to be further improved.

SUMMARY

It is an object of the present technology to provide a lighting device, a lighting fixture and a lighting system, each of which is capable of adjusting a light output of a solid light source at a lower luminous flux.

A lighting device (10) according to the present technology includes an electricity storage (1), a switching circuit (2) and a control circuit (3). The electricity storage (1) is configured to be electrically connected in parallel with a solid light source (20). The switching circuit (2) is configured to produce a current to supply the current to the electricity storage (1). The control circuit (3) is configured to receive a dimming level for adjusting a light output of the solid light source (20) and to control, according to the dimming level, burst dimming by controlling the switching circuit (2) so that the solid light source (20) is lit intermittently. The electricity storage (1) has a variable electricity storage capacity. The control circuit (3) includes an electricity storage controller (3e) and a signal modulator (3d). The electricity storage controller (3e) is configured to vary an electricity storage capacity of the electricity storage (1). The electricity storage controller (3e) is configured to set the electricity storage capacity of the electricity storage (1) to a first capacity (Cb) when the dimming level is a predetermined threshold level (D2) or more, and to set the electricity storage capacity of the electricity storage (1) to a second capacity (Cc) smaller than the first capacity (Cb) when the dimming level is below the threshold level (D2). The signal modulator (3d) is configured to vary a frequency by the burst dimming with respect to the switching circuit (2). The signal modulator (3d) is configured to set the frequency by the burst dimming to a first frequency (f1) when the dimming level is the threshold level (D2) or more, and to set the frequency by the burst dimming to a second frequency (f2) higher than the first frequency (f1) when the dimming level is below the threshold level (D2).

A lighting fixture (30) according to the present technology includes the lighting device (10) and the solid light source (20).

A lighting system (40) according to the present technology includes the lighting device (10) and a controller (41) that is configured to transmit a dimming signal containing information on the dimming level to the lighting device (10).

The lighting device can adjust a light output of the solid light source at a lower luminous flux.

The lighting fixture can have, through the lighting device, a configuration in which a light output of the solid light source can be adjusted at a lower luminous flux.

The lighting system can adjust a light output of the solid light source at a lower luminous flux based on the dimming signal from the controller.

BRIEF DESCRIPTION OF THE DRAWINGS

The figures depict one or more implementations in accordance with the present teaching, by way of example only, not by way of limitations. In the figure, like reference numerals refer to the same or similar elements where.

DETAILED DESCRIPTION

Embodiment 1

A lighting device 10 and a lighting system 40, according to the embodiment will be explained with reference to FIGS. 1A to 3. In the drawings, like kind elements are assigned identical reference numerals, and redundant description thereof will not be provided for sake of brevity.

The lighting device 10 according to the embodiment includes an electricity storage(s) 1, a switching circuit(s) 2 and a control circuit 3. (The embodiment is not limited to an example of FIG. 1A, but in the example the lighting device 10 includes two electricity storages 1 and two switching circuits 2.) The electricity storage 1 is electrically connected in parallel with a solid light source 20. The switching circuit 2 is configured to produce a (an electric) current to supply the current to the electricity storage 1. In the example, the switching circuit 2 includes a first switching device 2c, and is to adjust the current to be supplied to the electricity storage 1 by switching of the first switching device 2c. The control circuit 3 is configured to receive a dimming level for adjusting a light output of the solid light source 20 and to control, according to the dimming level, burst dimming by controlling the switching circuit 2 so that the solid light source 20 is lit intermittently. In the example, the control circuit 3 is to perform the control of burst dimming by controlling the switching of the first switching device 2c. The electricity storage 1 has a variable electricity storage capacity. The control circuit 3 includes an electricity storage controller 3e and a signal modulator(s) (in the example, two signal modulators) 3d. The electricity storage controller 3e is configured to vary an electricity storage capacity of the electricity storage 1. The electricity storage controller 3e is configured to set the electricity storage capacity of the electricity storage 1 to a first capacity Cb when the dimming level is a predetermined threshold level (with respect to the dimming level) or more, and to set the electricity storage capacity of the electricity storage 1 to a second capacity Cc smaller than the first capacity Cb when the dimming level is below the threshold level. The signal modulator 3d is configured to vary a frequency by the burst dimming with respect to the switching circuit 2. In the example, the signal modulator 3d is to vary a switching frequency by the burst dimming with respect to the first switching device 2c. The signal modulator 3d is configured to set the frequency by the burst dimming to a first frequency f1 when the dimming level is the threshold level or more, and to set the frequency by the burst dimming to a second frequency f2 higher than the first frequency f1 when the dimming level is below the threshold level. In an example, the frequency by the burst dimming (including f1 and f2) is set in a range of several hundred Hz to several kHz.

The lighting device 10 sets the electricity storage 1 and the frequency by the burst dimming to the first capacity Cb and the first frequency f1, respectively, in the case of the threshold level or more, while setting to the second capacity Cc and the second frequency f2, respectively, in the case of below the threshold level, thereby capable of dimming, or adjusting a light output of the solid light source 20 at a lower luminous flux.

Hereinafter, a more specific configuration of the lighting device 10 will be explained.

Figures 1A, 1B:
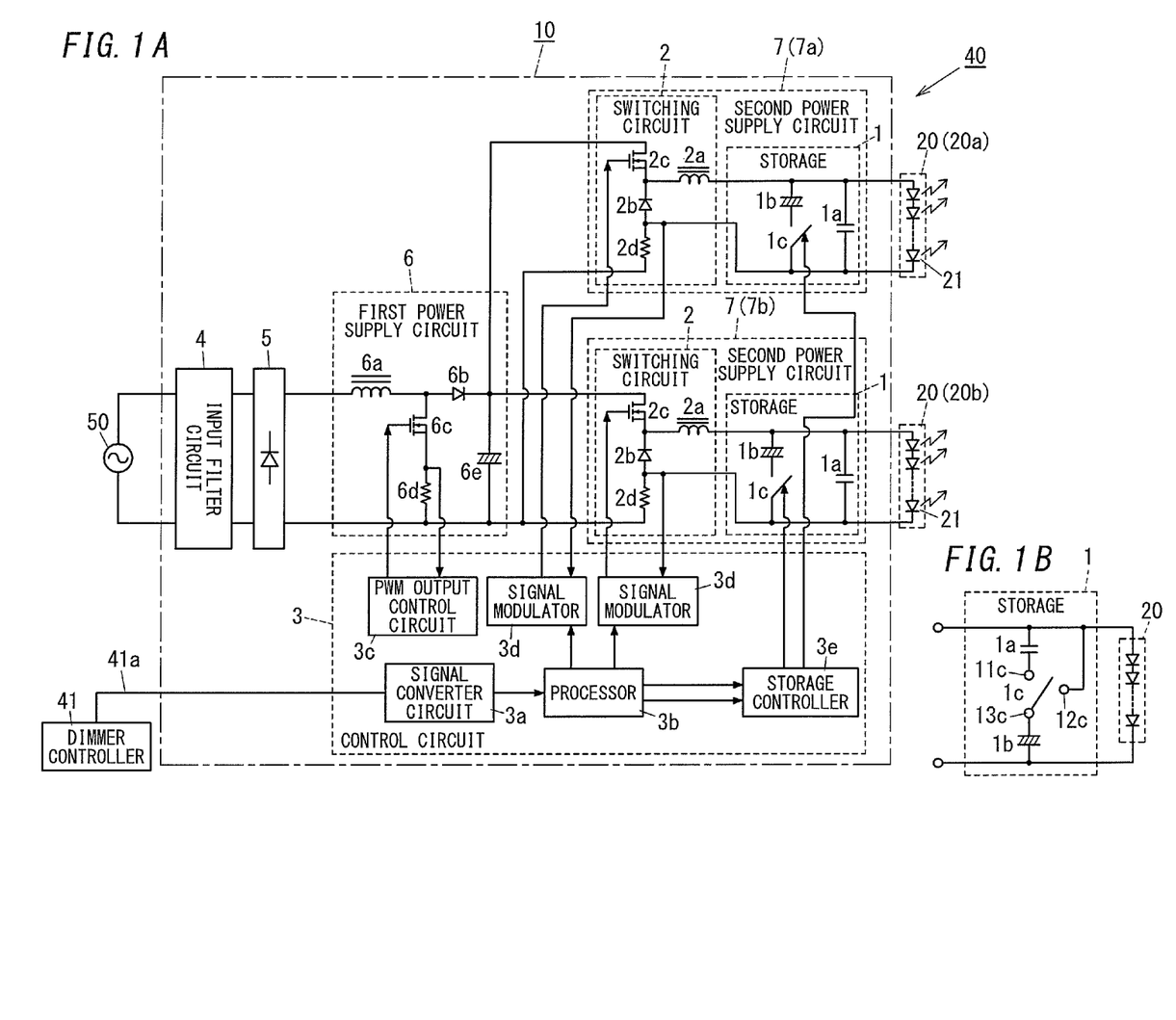
FIG. 1A is a circuit diagram of a lighting system including a lighting device, in accordance with Embodiment 1.
FIG. 1B shows a modified example of each electricity storage in FIG. 1A.

In the example of FIG. 1A, the lighting device 10 is electrically connected with a dimmer controller 41 and an external power supply 50 in addition to, e.g., two solid light sources 20. The lighting device 10 includes an input filter circuit 4, a rectifier circuit 5 and a first power supply circuit 6 in addition to, for example, two electricity storages 1, two switching circuits 2 and the control circuit 3. The first power supply circuit 6 is, e.g., a step-up chopper, and both input ends thereof are electrically connected with the external power supply 50 through the input filter circuit 4 and the rectifier circuit 5. Both output ends of the first power supply circuit 6 are electrically connected with both input ends of each of, e.g., two second power supply circuits 7. Each of the two second power supply circuits 7 is, e.g., a step-down chopper that is formed of an electricity storage 1 and a switching circuit 2. Both output ends of each second power supply circuit 7 are electrically connected with a solid light source 20. In the example, the lighting device 10 includes the two second power supply circuits 7 that are configured to individually light the two solid light sources 20. The two second power supply circuits 7 have the same basic configurations.

Both input ends of each of the two switching circuits 2 are electrically connected with both the output ends of the first power supply circuit 6. Each of the two electricity storages 1 is electrically connected between both output ends of a corresponding switching circuit 2. Each electricity storage 1 has a positive terminal (an end on a high potential side) to be electrically connected with an anode of a solid light source 20, and a negative terminal (an end on a low potential side) to be electrically connected with a cathode of the solid light source 20. Each electricity storage 1 is configured to smooth a current to flow from a corresponding switching circuit 2 to a solid light source 20.

Each electricity storage 1 includes a first capacitor 1a, a second capacitor 1b and a first switch device 1c. The second capacitor 1b is electrically connected in series with the first switch device 1c. The first capacitor 1a is electrically connected in parallel with a series circuit of the second capacitor 1b and the first switch device 1c. The first switch device 1c is to be turned on and off according to a control signal from the electricity storage controller 3e. When the first switch device 1c is in an OFF state, the electricity storage 1 including the first switch device 1c has an electricity storage capacity corresponding to capacitance of the first capacitor 1a. When the first switch device 1c is in an ON state, the electricity storage 1 has an electricity storage capacity corresponding to combined capacitance of a parallel circuit of the first and second capacitors 1a and 1b. In this way, the first switch device 1c is switched between the ON and OFF states, whereby the electricity storage 1 can have a variable electricity storage capacity.

The electricity storages 1 are not limited to a configuration in which a first capacitor 1a is electrically connected in parallel with a series circuit of a second capacitor 1b and a first switch device 1c. As a configuration example, the electricity storages 1 may have a configuration in which a switching circuit 2 and a solid light source 20 are electrically connected with either a first capacitor 1a or a second capacitor 1b through a first switch device 1c. In this case, the first switch device 1c is electrically connected with each of the first capacitor 1a and the second capacitor 1b. Specifically, the first switch device 1c differs from that having two terminals as shown in FIG. 1A in which the first switch device 1c of the configuration example has first and second terminals and a common terminal. First ends of the first and second capacitors 1a and 1b are to be electrically connected with an anode of a solid light source 20, while the common terminal of the first switch device 1c is to be electrically connected with a cathode of the solid light source 20. The first and second terminals of the first switch device 1c are electrically connected individually with second ends of the first and second capacitors 1a and 1b. Alternatively, the electricity storages 1 may have a configuration in which two first switch devices 1c having two terminals as shown in FIG. 1A are electrically connected in series with the first and second capacitors 1a and 1b, respectively. Thus, the electricity storages 1 can have a configuration in which an electricity storage 1 can have an electricity storage capacity corresponding to capacitance of first or second capacitor 1a or 1b by switch control of a first switch device 1c.

The electricity storages 1 are not limited to a configuration in which a first capacitor 1a is electrically connected in parallel with a second capacitor 1b. As another configuration example, the electricity storages 1 may have a configuration in which a first capacitor 1a, a first switch device 1c and a second capacitor 1b are electrically connected in series. Specifically, the first switch device 1c has first and second terminals and a common terminal. A first end of the first capacitor 1a is to be electrically connected with an anode of a solid light source 20, while a first end of the second capacitor 1b is to be electrically connected with a cathode of the solid light source 20. The first terminal of the first switch device 1c is electrically connected with a second end of a first or second capacitor 1a or 1b, the second terminal thereof is electrically connected with a first end of a first or second capacitor 1a or 1b, and the common terminal thereof is electrically connected with a second end of a second or first capacitor 1b or 1a, respectively. In this way, if the first capacitor 1a, the first switch device 1c and the second capacitor 1b are electrically connected in series, either of the first and second capacitors 1a and 1b is electrically connected with the switching circuit 2 and the solid light source 20 when the common terminal of the first switch device 1c is switched to the second terminal thereof. In this case, the electricity storage 1 has an electricity storage capacity of corresponding to capacitance either of the first and second capacitors 1a and 1b. On the other hand, when the common terminal of the first switch device 1c is switched to the first terminal thereof, the electricity storage 1 has an electricity storage capacity by combined capacitance of a series circuit of the first and second capacitors 1a and 1b. In a specific example of FIG. 1B, the first terminal 11c of the first switch device 1c is electrically connected with the second end of the first capacitor 1a, the second terminal 12c is electrically connected with the first end of the first capacitor 1a, and the common terminal 13c is electrically connected with the second end of the second capacitor 1b.

The electricity storages 1 are not limited to a configuration in which two capacitors of first and second capacitors 1a and 1b are provided. Each of the electricity storages 1 may be provided with two or more capacitors as long as having a variable electricity storage capacity. Preferably, each electricity storage 1 includes capacitors and (a) switch devices for switching electrical connections of the capacitors, and is configured to have a variable electricity storage capacity by changing the electrical connections of the capacitors through the switch devices. The variable electricity storage capacity may be appropriately set in consideration of a solid light source 20 to be connected and a dimming level range. When the variable electricity storage capacity is varied, a time constant for charging and discharging the electricity storage 1 having the variable electricity storage capacity is varied. The time constant when the variable electricity storage capacity is large is larger than the time constant when the variable electricity storage capacity is small.

In the example of FIG. 1A, each switching circuit 2 includes a first inductor 2a, a first diode 2b, a first switching device 2c and a first current sensor (e.g., a resistor) 2d. The first switching device 2c may be a MOSFET (Metal Oxide Semiconductor Field Effect Transistor), for example. The MOSFET may be, e.g., an n-channel MOSFET. A first end of the first inductor 2a is electrically connected with a junction of a first terminal (a source terminal) of the first switching device 2c and a cathode of the first diode 2b. A second end of the first inductor 2a is electrically connected with a positive terminal of a corresponding electricity storage 1. A negative terminal of the corresponding electricity storage 1 is electrically connected with a junction of an anode of the first diode 2b and the first current sensor 2d. A control terminal (a gate terminal) of the first switching device 2c is electrically connected with a corresponding signal modulator 3d. ON/OFF switching control of the first switching device 2c is performed by a control signal from the corresponding signal modulator 3d. Each switching circuit 2 can generate an output voltage across both ends of a corresponding electricity storage 1 by switching of its own first switching device 2c.

In the example, the control circuit 3 includes a signal converter circuit 3a, a processor (a microcomputer) 3b and a PWM (Pulse Width Modulation) output control circuit 3c in addition to the signal modulators 3d and the electricity storage controller 3e. The PWM output control circuit 3c of the control circuit 3 is configured to control the first power supply circuit 6. The control circuit 3 (the processor 3b) is configured to control the second power supply circuits 7 through the signal modulators 3d.

The signal converter circuit 3a is configured to receive a dimming signal from the dimmer controller 41. The dimming signal contains information on a dimming level for adjusting a light output of each solid light source 20. The signal converter circuit 3a is configured to be electrically connected with the dimmer controller 41 through, for example, a dimming signal line 41a, and to produce a signal corresponding to the dimming signal from the dimmer controller 41. For example, the dimming signal may be a PWM signal. In this case, the signal converter circuit 3a is configured to convert the PWM signal into a DC voltage signal. For example, the PWM signal may be converted into a DC voltage signal having an amplitude corresponding to ON periods of ON-and-OFF cycle of the PWM signal. Specifically, the signal converter circuit 3a may be formed of a waveform shaping circuit that is configured to shape a waveform of the dimming signal transmitted from the dimmer controller 41, and a smoothing circuit that is configured to smooth the waveform-shaped signal to generate a DC voltage signal. The DC voltage signal is transmitted to an A/D conversion input terminal of the processor 3b and then converted into a digital value.

The processor 3b includes a built-in memory. The memory includes pre-stored programs to be executed by the processor 3b. The processor 3b may have a data table stored in the built-in memory. In a case where the two solid light sources 20 are configured to emit respective light of which luminescent colors are different from each other, the data table may contain data on light reproduced by mixing luminescent colors of light emitted from the two solid light sources 20. The processor 3b may be configured, according to the dimming signal, to individually control the two second power supply circuits 7 so that the two solid light sources 20 are supplied with respective currents corresponding to the data of the data table. In this configuration, it is possible to adjust not only the light outputs but also luminescent colors of the two solid light sources 20. If the processor 3b receives a dimming signal from the dimmer controller 41 to transmit instruction signals for controlling the signal modulators 3d to the signal modulators 3d, the signal modulators 3d are to transmit control signals to the second power supply circuits 7 based on the instruction signals.

The PWM output control circuit 3c is configured to adjust electric power to be supplied from the first power supply circuit 6 to the second power supply circuits 7 by transmitting a PWM signal to a second switching device 6c of the first power supply circuit 6. Switching of the second switching device 6c is to be controlled by the PWM signal from the PWM output control circuit 3c. The PWM output control circuit 3c is also configured to detect a current flowing through a second current sensor (e.g., a resistor) 6d of the first power supply circuit 6 and to control switching of the second switching device 6c based on the detected current. By controlling the second switching device 6c, the PWM output control circuit 3c can stabilize an output current of the first power supply circuit 6.

In an example, the first power supply circuit 6 further includes an input current sensor (not shown) that is configured to detect an input current into the first power supply circuit 6. For example, the input current sensor may be an inductor that is magnetically connected with a second inductor 6a. In this example, the PWM output control circuit 3c is configured to turn the second switching device 6c on at timing when the input current detected with the input current sensor becomes zero, and to turn the second switching device 6c off at timing when the current detected with the second current sensor 6d reaches a standard threshold.

Each signal modulator 3d is configured to control switching of a corresponding first switching device 2c by a control signal. The control signal may be a PWM signal of which frequency is 1 kHz, for example. Each signal modulator 3d may include a PWM output circuit, and a current sensor that is configured to detect a current flowing through a corresponding solid light source 20. For example, the current sensor may include an A/D converter circuit, and be electrically connected with a junction of a first diode 2b and a first current sensor 2d in a corresponding switching circuit 2. In this case, each signal modulator 3d can perform feedback control for stabilizing a current flowing through a corresponding solid light source 20. Each signal modulator 3d is controlled by an instruction signal as a step-down chopper control signal from the processor 3b, and supplies a corresponding first switching device 2c with a control signal for controlling switching of the corresponding first switching device 2c based on the step-down chopper control signal. An example of the control signal includes a burst dimming signal for adjusting a light output of a corresponding solid light source 20 by burst dimming. The control signal is not limited to the burst dimming signal, but may be a DC (Direct Current) dimming signal for adjusting a light output of a corresponding solid light source 20 by DC dimming.

The input filter circuit 4 may be formed of, for example, a capacitor and a choke coil. Both input ends of the input filter circuit 4 are electrically connected with the external power supply 50. For example, the external power supply 50 may be a commercial AC power supply. The input filter circuit 4 may be a low pass filter that is configured to remove high frequency components generated by the first power supply circuit 6 and the second power supply circuits 7. In this case, the input filter circuit 4 can restrain the propagation, of the high frequency components generated by the first power supply circuit 6 and the second power supply circuits 7, to the external power supply 50. The input filter circuit 4 can also restrain the propagation, of noise contained in an AC voltage from the external power supply 50, to the first power supply circuit 6.

The rectifier circuit 5 has both input ends that are electrically connected with both output ends of the input filter circuit 4. The rectifier circuit 5 is configured to full-wave rectify an AC voltage from the input filter circuit 4 to supply the full-wave rectified voltage to the first power supply circuit 6. The rectifier circuit 5 may be formed of, e.g., a diode bridge circuit including four diodes.

The first power supply circuit 6 includes the second inductor 6a, a second diode 6b, the second switching device 6c, the second current sensor 6d and a third capacitor 6e. A series circuit of the second inductor 6a and the second diode 6b is electrically connected between a first output end (a positive output terminal) of the rectifier circuit 5 and a positive terminal (an end on a high potential side) of the third capacitor 6e. The third capacitor 6e is electrically connected in parallel with a series circuit of the second diode 6b, the second switching device 6c and the second current sensor 6d. An anode of the second diode 6b is electrically connected with the second inductor 6a, while a cathode of the second diode 6b is electrically connected with the positive terminal of the third capacitor 6e. The third capacitor 6e may be a smoothing capacitor. The second switching device 6c may be, for example, a MOSFET. A first terminal (a drain terminal) of the second switching device 6c is electrically connected with a junction of the second inductor 6a and the anode of the second diode 6b. A second terminal (a source terminal) of the second switching device 6c is electrically connected with a negative terminal (an end on a low potential side) of the third capacitor 6e through the second current sensor 6d. A control terminal (a gate terminal) of the second switching device 6c is electrically connected with the PWM output control circuit 3c. A junction of the second switching device 6c and the second current sensor 6d is also electrically connected with the PWM output control circuit 3c. In this example, ON/OFF switching control of the second switching device 6c in the first power supply circuit 6 can be perform by the output of the PWM output control circuit 3c. As a result, the first power supply circuit 6 can apply an output voltage across the third capacitor 6e by the switching control of the second switching device 6c.

When the second switching device 6c is in an OFF state, a voltage is applied across the third capacitor 6e through the second inductor 6a and the second diode 6b. When the second switching device 6c is in an ON state, a series circuit of the second inductor 6a, the second switching device 6c and the second current sensor 6d is electrically connected with the rectifier circuit 5. When the second switching device 6c in the ON state is turned off, counter electromotive force is generated across the second inductor 6a by magnetic energy stored in the second inductor 6a. Thus, the lighting device 10 can step up the voltage full-wave rectified with the rectifier circuit 5. The lighting device 10 is not necessarily provided with the first power supply circuit 6 and the PWM output control circuit 3c because the components depend on a kind of the external power supply 50 or the like. The lighting device 10 may be configured to generate a DC voltage only by the smoothing capacitor without the first power supply circuit 6 and the PWM output control circuit 3c. In this case, the lighting device 10 is to perform power conversion with respect to the DC voltage across the smoothing capacitor through the second power supply circuits 7.

Each second power supply circuit 7 is configured to adjust a current flowing through a corresponding solid light source 20. The lighting device 10 includes the two second power supply circuits 7 in order to individually adjust the light outputs of the two solid light sources 20. The two solid light sources 20 may have the same configuration or different configurations. When the two solid light sources 20 have different configurations, they may include, for example, a first solid light source 20a that is configured to emit light of which color is daylight white color in conformity with JIS Z 9112 and a second solid light source 20b that is configured to emit light of which color is bulb color in conformity with JIS Z 9112. Hereinafter, one of the two second power supply circuits 7 is also called a "daylight white power supply circuit 7a", and the other is also called a "bulb color power supply circuit 7b". The daylight white power supply circuit 7a is electrically connected with the first solid light source 20a. The bulb color power supply circuit 7b is electrically connected with the second solid light source 20b. By appropriately adjusting a frequency and a pulse width of a control signal to be output from each signal modulator 3d, a light output of a corresponding solid light source 20 can be adjusted. In each second power supply circuit 7, a series circuit of a first switching device 2c, a first diode 2b and a first current sensor 2d is electrically connected between both ends of a corresponding third capacitor 6e. In each second power supply circuit 7, ON/OFF switching of a first switching device 2c is controlled by a control signal from a corresponding signal modulator 3d, whereby a DC voltage obtained by stepping down an input DC voltage can be applied across a corresponding electricity storage 1. As a result, each second power supply circuit 7 can supply a current from a corresponding electricity storage 1 to a solid light source 20.

Each solid light source 20 includes an LED module. The LED module includes a plurality of LED devices 21 that are electrically connected in series. The LED module is not limited to a configuration in which the plurality of LED devices 21 are electrically connected in series. The plurality of LED devices 21 may be electrically connected in parallel or electrically connected in series and parallel. The LED module includes the plurality of LED devices 21, but may include just one LED device 21.

Preferably, each LED device 21 is a white LED. The white LED may include a blue LED and phosphor. The phosphor may be phosphor that absorbs part of light from the blue LED to emit yellow light. By changing a kind of the phosphor to another, the white LED can be configured to emit light of which color is classified into light source color such as daylight color, daylight white (neutral white), white, warm white or bulb color in conformity with JIS Z 9112. The first solid light source 20a may include white LEDs each of which is configured to emit light of which color is daylight color in conformity with JIS Z 9112, for example. The second solid light source 20b may include white LEDs each of which is configured to emit light of which color is bulb color in conformity with JIS Z 9112, for example. Each solid light source 20 may be formed of any one of different types of LED modules having luminescent colors different from each other. In this case, the lighting device 10 can adjust the light outputs of the solid light sources 20 by individually adjusting the light outputs of the first and second solid light sources 20a and 20b. The lighting device 10 can also change a color temperature of light (luminescent) color of the solid light sources 20 by individually adjusting the light outputs of the first and second solid light sources 20a and 20b. By individually adjusting the light outputs of white LED modules having different color tones, the lighting device 10 can decrease the color temperature of the LED modules according to a reduction in a dimming level like an incandescent lamp. By decreasing the color temperature of the solid light sources 20 according a decrease in a dimming level like an incandescent lamp, the lighting device 10 can prevent the solid light sources 20 from emitting uncomfortable light away from a black body radiation locus.

The lighting device 10 is not limited to a configuration in which the light outputs of the solid light sources 20 that are two kinds of white LED modules are controlled. The lighting device 10 may be configured to control light outputs of solid light sources 20 that are three or more kinds of LED modules. The three or more kinds of LED modules may include a blue LED module, a green LED module and an red LED module. Each component of the solid light sources 20 is not limited to an LED device 21. Each solid light source 20 may include at least a light-emitting semiconductor device such as a semiconductor laser or an organic EL (Electro Luminescence) device.

Preferably, the dimmer controller 41 includes a dimming signal generator that is configured to generate a dimming signal. The dimmer controller 41 may be configured to transmit a dimming signal to the lighting device 10. For example, the dimmer controller 41 may include a bidirectional thyristor. The dimmer controller 41 may be configured to output a PWM signal as the dimming signal. The dimming signal with respect to a solid light source 20 can represent a dimming level as a ratio of a light output (a light amount), in a dimming state according to ON duty, of the solid light source 20 to a rated light output (a light amount) of the solid light source 20. Instead of the PWM signal, the dimmer controller 41 may transmit a dimming signal to the lighting device 10, by a signal based on DALI (Digital Addressable Lighting Interface) or a communication protocol of DMX 512. When receiving the dimming signal from the dimmer controller 41, the lighting device 10 adjusts the light outputs of the solid light sources 20 to a dimming level represented by the dimming signal.

The dimmer controller 41 may be a light controller that is configured to individually control a plurality of lighting devices 10. The dimmer controller 41 can be used for a lighting system 40 that is configured to individually transmit dimming signals to a plurality of lighting devices 10 to individually control the plurality of lighting devices 10. The plurality of lighting devices 10 is electrically connected with the dimmer controller 41, which constitute the lighting system 40. In the lighting system 40, the plurality of lighting devices 10 may be electrically connected in parallel with the external power supply 50. The lighting system 40 may be configured so that a dimming signal is supplied from a common dimmer controller 41 to each of the plurality of lighting devices 10. By dimming the plurality of lighting devices 10 through the one dimmer controller 41, the lighting system 40 can light a whole illumination space by respective light from the dimmed lighting devices 10. In the lighting system 40, the dimmer controller 41 functions as a controller that is configured to transmit a dimming control to each of the plurality of lighting devices 10.

In other words, the lighting system 40 preferably includes at least one lighting device 10 and a controller configured to transmit a dimming signal containing information on a dimming level to the lighting device 10.

The lighting system 40 includes a lighting device(s) 10 that is configured to adjust a light output(s) of a solid light source(s) 20 at a lower luminous flux, thereby capable of enhancing rendering effect by fading-in/out or the like.

Usage of the lighting device 10 is not limited to the lighting system 40. The lighting device 10 may be used for, e.g., a back light of a liquid-crystal display, or a light source of an electronic device such as a copying machine, a scanner or a projector.

Hereinafter, an operation of a lighting device 10 according to the embodiment will be explained in detail. First, a comparison example to be compared with the embodiment is explained.

Figure 6:
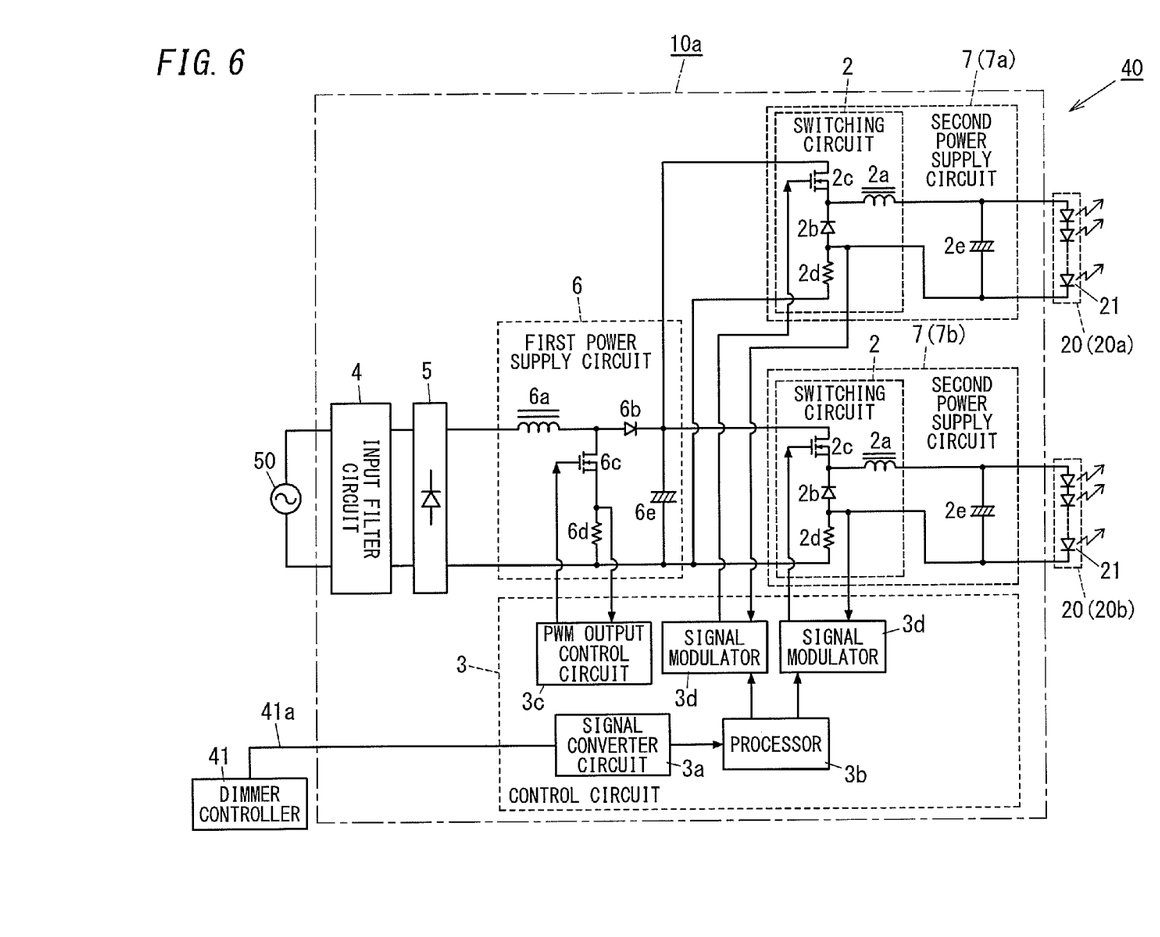
FIG. 6 is a circuit diagram of a lighting system including a lighting device, as a comparison example compared with Embodiment 1.

A lighting device 10a of the comparison example shown in FIG. 6 includes no electricity storage controller 3e unlike the lighting device 10 of the embodiment. The lighting device 10a mainly differs from the lighting device 10 of the embodiment in that it includes fourth capacitors 2e having constant capacitance instead of the electricity storages 1 having a variable capacitance. Each of the fourth capacitors 2e is configured to smooth a current to flow through a solid light source 20.

The lighting device 10a is configured to light solid light sources 20 by DC dimming or burst dimming. The lighting device 10a (a control circuit 3) is configured to perform DC dimming with respect to the solid light sources 20 by continuously lighting the solid light sources 20 (through switching circuits 2). With the DC dimming, the lighting device 10a (a control circuit 3) is configured to adjust light outputs of the solid light sources 20 by changing amplitude of a DC current flowing through each of the solid light sources 20 to be continuously lit (through the switching circuits 2). The lighting device 10a (the control circuit 3) is also configured to perform the burst dimming with respect to the solid light sources 20 by intermittently lighting the solid light sources 20 (through the switching circuits 2). With the burst dimming, the lighting device 10a (the control circuit 3) is configured to adjust the light outputs of the solid light sources 20 by varying a time ratio of a lighting period of each of the solid light sources 20 to be intermittently lit (through the switching circuits 2). A frequency by burst dimming means a frequency (lighting frequency) for intermittent lighting by the burst dimming. In the case of the DC dimming in the lighting device 10a, a lower limit of a variable dimming level is restricted by a minimum on-time of a first switching device 2c in each switching circuit 2. In the case of the burst dimming in the lighting device 10a, the variable dimming level is not restricted by a minimum on-time of each of the first switching devices 2c. In this case, the light outputs of the solid light sources 20 can be adjusted at a luminous flux lower than that in the case of the DC dimming.

Figure 7:
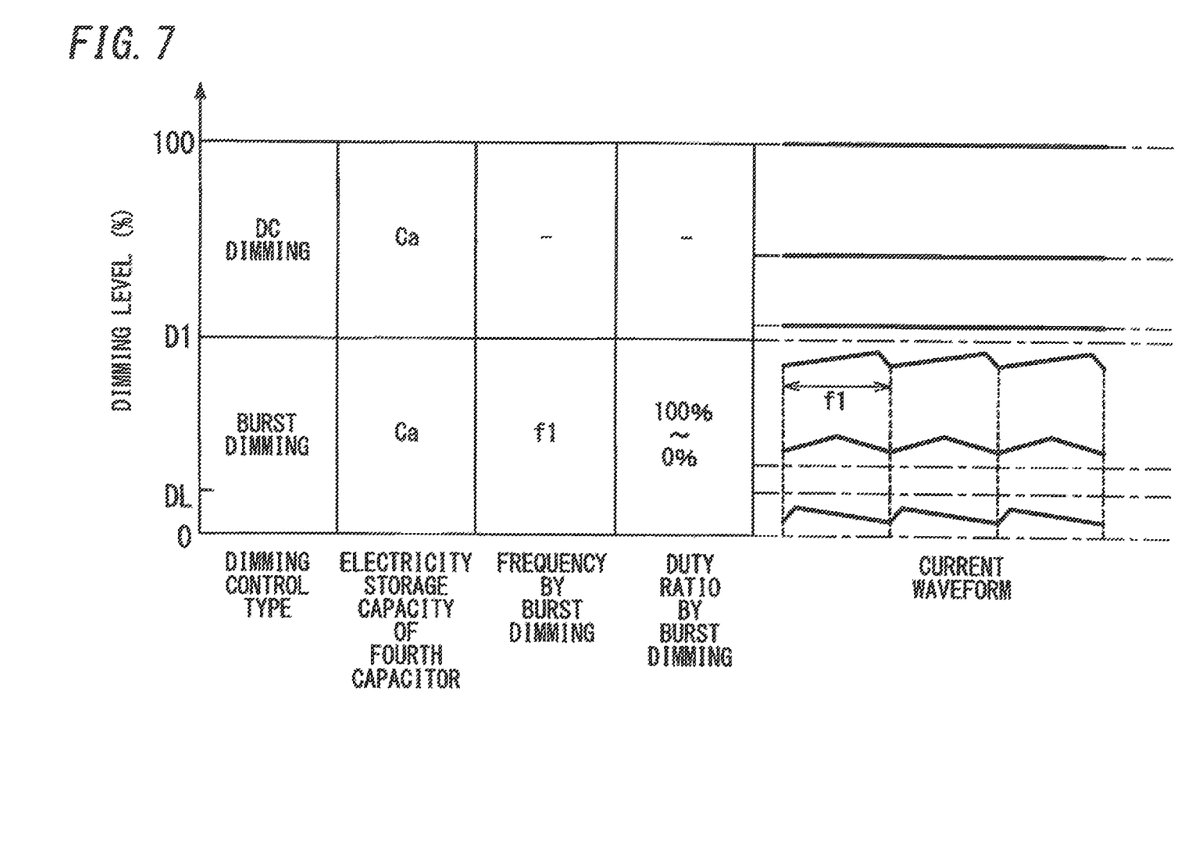
FIG. 7 is a view illustrating an operation of the lighting device as the comparison example.

In the lighting device 10a, the control circuit 3 adjusts the light outputs of the solid light sources 20 based on a dimming signal from a dimmer controller 41. The lighting device 10a is configured to supply maximum output currents to the solid light sources 20 when a dimming level (%) is 100. As shown in FIG. 7, the lighting device 10a is configured to perform the DC dimming when the dimming level (%) is in a range between 100 and a given D1. In the case of the DC dimming, the control circuit 3 of the lighting device 10a controls the switching circuits 2 so that values of the DC currents flowing through the solid light sources 20 decrease as the dimming level (%) decreases from 100. In the DC dimming, each solid light source 20 is supplied with a current having a linear waveform as shown in a current waveform of FIG. 7.

The lighting device 10a is configured to perform the burst dimming when the dimming level (%) is in a range between the D1 and 0. In the burst dimming, when the dimming level (%) is in a range between D1 and 0, the lighting device 10a fixes, to a first frequency f1, a frequency by the burst dimming of a signal supplied to each of the first switching devices 2c from the signal modulators 3d. When the dimming level (%) is in the range between D1 and 0, the control circuit 3 of the lighting device 10a controls the switching circuits 2 so that a duty ratio by the burst dimming decreases as the dimming level (%) decreases from D1. In the lighting device 10a, when the dimming level (%) is in the range between D1 and 0, an electricity storage capacity of each fourth capacitor 2e varies according to a decrease in ON duty. That is, the lighting device 10a supplies a triangular waveform current from each fourth capacitor 2e to a solid light source 20. Capacitance of each fourth capacitor 2e is shown by Ca. With the burst dimming, when the dimming level (%) is in the range between D1 and 0, each solid light source 20 is supplied with a triangular waveform current as shown in the current waveform of FIG. 7.

In the lighting device 10a, each fourth capacitor 2e is electrically connected in parallel with a solid light source 20, whereby a triangular waveform current that is substantially a DC current can be supplied to each of the solid light sources 20 even in the case of the burst dimming. The lighting device 10a includes the fourth capacitors 2e, thereby capable of suppressing occurrence of a flicker phenomenon causing flickering in an image of video equipment such as a video camera. The flicker phenomenon is a phenomenon of the flickering in an image of the video equipment that occurs by difference between a period of the burst dimming and a period of shutter speed of the video equipment. The lighting device 10a lights each solid light source 20 by a continuous triangular waveform current, thereby capable of further suppressing the occurrence of the flicker phenomenon in comparison with a case where each solid light sources 20 are lit by a rectangular waveform current.

In a case of deep dimming, it may be hard for the lighting device 10a to adjust the light outputs of the solid light sources 20 at high accuracy. The deep dimming means a dimming that is deep and in a dimming level range of which lower limit is near to 0. Each solid light source 20 is formed of semiconductor light emitting devices. Each semiconductor light emitting device has a typical feature that a leakage current flows therethrough. Because of a leakage current that flows through each solid light source 20, the lighting device 10a cannot light the solid light sources 20 at a dimming level (%) below DL that is the leakage current or less, even by adjusting the light outputs of the solid light sources 20 while simply decreasing a duty ratio by the burst dimming and reducing average currents flowing through the solid light sources 20. As a result, the lighting device 10a may be hard to adjust the light outputs of the solid light sources 20 at high accuracy when the dimming level (%) is in a range between DL and 0.

Figure 2:
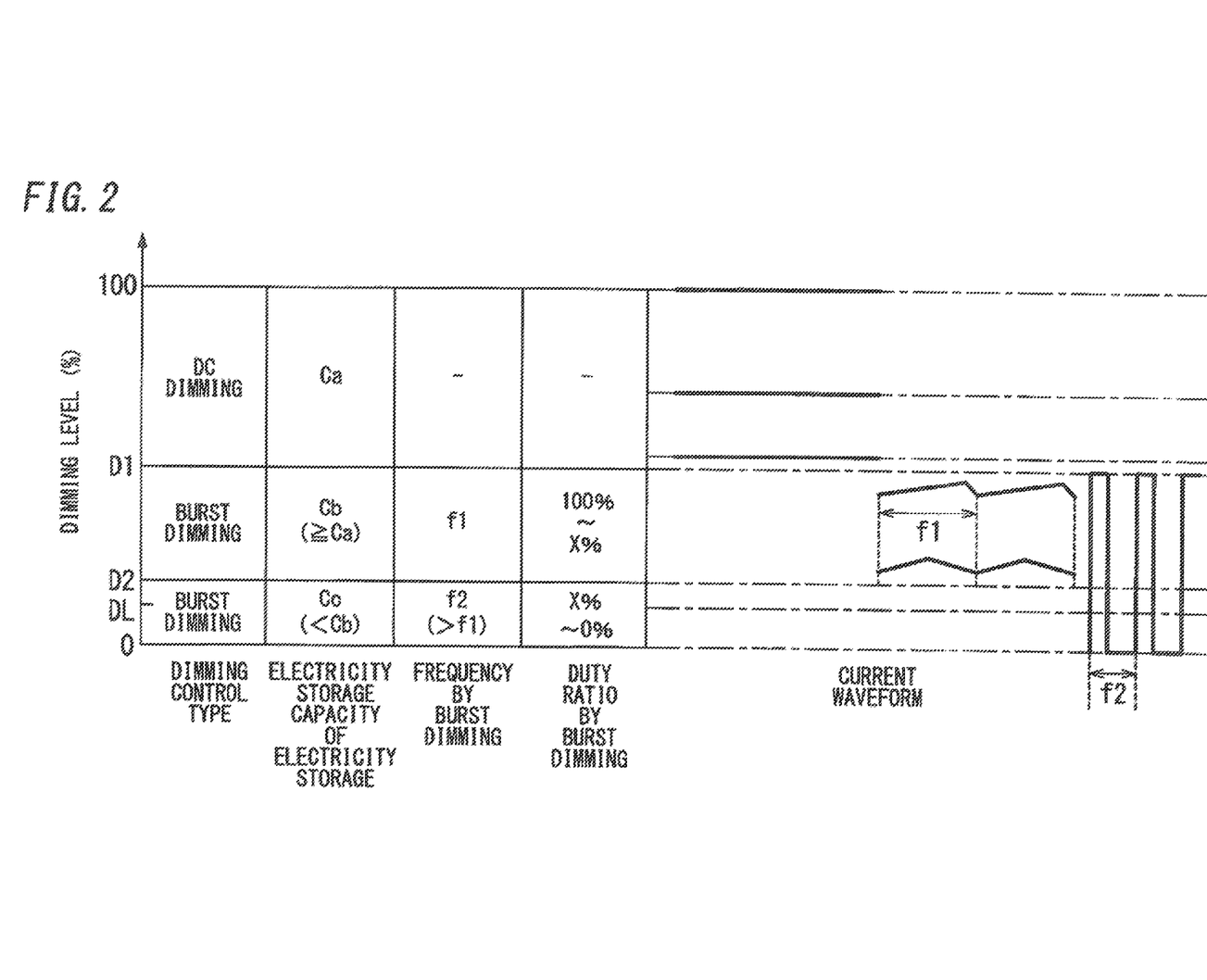
FIG. 2 is a view illustrating an operation of the lighting device.

In the lighting device 10 according to the embodiment, the control circuit 3 adjusts the light outputs of the solid light sources 20 based on a dimming signal from the dimmer controller 41. The lighting device 10 is configured to supply a maximum output current to the solid light sources 20 when a dimming level (%) (a dimming level contained in the dimming signal) is 100. As shown in FIG. 2, the lighting device 10 is configured to perform DC dimming when the dimming level (%) is in a range between 100 (e.g., a level corresponding to a rated light output) and a given D1 (a given first level) lower than 100. The lighting device 10 (the control circuit 3) is configured to perform the DC dimming by continuously controlling the switching circuits 2 (switching of the first switching devices 2c) so that vales of DC currents flowing through the solid light sources 20 decrease as the dimming level (%) decreases from 100. Therefore, in the DC dimming, a current supplied to each solid light source 20 has a linear waveform as shown in a current waveform of FIG. 2. With the DC dimming, the electricity storage controller 3e of the lighting device 10 controls the first switch devices 1c so that each of them is in an ON state. In the lighting device 10, when each of the first switch devices 1c is in an ON state, each of the electricity storages 1 has combined capacitance of respective capacitance of its own first and second capacitors 1a and 1b. Capacitance of each of the electricity storages 1 in this case is shown by Ca.

The lighting device 10 is configured to perform burst dimming when the dimming level (%) is in a range between D1 and 0. The lighting device 10 (the processor 3b) is set to the dimming level (%) of D1 so that the currents flowing through the solid light sources 20 are larger than leakage currents of the solid light sources 20, respectively. The lighting device 10 is configured to perform the burst dimming so that the electricity storage capacities of the electricity storages 1 and frequencies by the burst dimming (i.e., signal frequencies to the first switching devices 2c) when the dimming level (%) is in a range between D1 and D2 darker than D1 respectively differs from the electricity storage capacities of the electricity storages 1 and frequencies by the burst dimming when the dimming level (%) is in a range between D2 and 0. In the lighting device 10 shown in an example of FIG. 2, the range between D2 and 0 includes a range between DL and 0 when the solid light sources 20 are lit by currents below the leakage currents DL of the solid light sources 20. When the dimming level (%) is in the range between D1 and D2, the electricity storage controller 3e of the lighting device 10 controls the first switch devices 1c so that each of them is in an ON state. When each of the first switch device 1c is in an ON state, each of the electricity storages 1 has an electricity storage capacity corresponding to combined capacitance of respective capacitance of its own first and second capacitors 1a and 1b. In this case, an electricity storage capacity of each of the electricity storages 1 is a first capacity Cb that equals corresponding capacitance Ca.

The lighting device 10 is not limited to a configuration in which an electricity storage capacity Ca by the DC dimming and a first capacity Cb by the burst dimming in each electricity storage 1 are set to the same capacity. Preferably, the lighting device 10 sets the first capacities Cb to the electricity storage capacities Ca by the DC dimming or more.

In the example of FIG. 2, with the burst dimming when the dimming level (%) is in the range between D1 and D2, the lighting device 10 (the processor 3b) fixes, to the first frequency f1, a frequency of each of the control signals supplied to the first switching devices 2c from the signal modulators 3d. When the dimming level (%) is in the range between D1 and D2, the lighting device 10 (the processor 3b) controls the switching circuits 2 (through the signal modulators 3d) so that a duty ratio with respect to each first switching device 2c decreases from 100% to X % as the dimming level (%) decreases from D1. In this case, each electricity storage capacity of the electricity storages 1 varies according to a decrease in each ON duty with respect to the first switching devices 2c. The lighting device 10 lights the solid light sources 20 by triangular waveform currents, thereby capable of suppressing occurrence of a flicker phenomenon in comparison with a case where the solid light sources 20 are lit by rectangular waveform currents.

When the dimming level (%) is in the range between D2 and 0, the electricity storage controller 3e of the lighting device 10 controls the first switch devices 1c so that each of them is in an OFF state. When each of the first switch devices 1c is in an OFF state, electricity storage capacities of the electricity storages 1 correspond to only respective capacitance of the first capacitors 1a. In this case, the electricity storages 1 respectively have electricity storage capacities corresponding to the second capacities Cc smaller than the first capacities Cb. When the dimming level (%) is in the range between D2 and 0, the lighting device 10 (the processor 3b) sets, to the second frequency frequencies f2 higher than the first frequencies f1, frequencies by the burst dimming of the control signals supplied to the first switching devices 2c from the signal modulators 3d, respectively. The lighting device 10 (the processor 3b) controls the second power supply circuits 7 (the switching circuits 2 through the signal modulators 3d) so that a duty ratio with respect to each first switching device 2c decreases from X % to 0% as the dimming level (%) decreases from D2. When the dimming level (%) is in the range between D2 and 0, each capacitance of the first inductors 1a is constant even if a duty ratio (ON duty) with respect to each first switching device 2c decreases. In the burst dimming when the dimming level (%) is in the range between D2 and 0, each current supplied to the solid light sources 20 has a rectangular waveform as shown in the current waveform of FIG. 2.

In this way, the lighting device 10 (the control circuit 3) supplies rectangular waveform currents to the solid light sources 20 (through the second power supply circuits 7). Currents supplied to the solid light source 20 from the lighting device 10 have rectangular waveforms and are larger than leakage currents of the solid light sources 20. Thus, since values of the currents supplied to the solid light sources 20 from the lighting device 10 are larger than values of the leakage current, deep dimming control can be performed efficiently. With video cameras, control for increasing exposure time in video photographing is often performed in dark environment such as the deep dimming performed by the lighting device 10. In the case of the deep dimming by the lighting device 10, even if the rectangular waveform currents are supplied to the solid light sources 20, the occurrence of a flicker phenomenon can be suppressed because the exposure time in video photographing is increased.

With the deep dimming, the lighting device 10 of the embodiment performs rectangular waveform current based lighting control in a state in which the electricity storage capacities of the electricity storages 1 connected in parallel with the solid light sources 20 are decreased. The lighting device 10 increases frequencies by the burst dimming up to frequencies at each of which a flicker phenomenon is not revealed, and supplies the solid light sources 20 with currents larger than the leakage currents of the solid light sources 20, thereby lighting the solid light sources 20. Even when adjusting the light outputs of the solid light sources 20 at a lower luminous flux, the lighting device 10 can adjust the light outputs of the solid light sources 20 at higher accuracy.

In the lighting field in particular, not only deep dimming but also color adjustment is required. The color adjustment means adjusting mixed colors of respective light from two or more color solid light sources 20 to a desired (luminescent) color. Performance of the color adjustment means a (luminescent) color range and feasibility on deep dimming in the color range. The lighting device 10 can control the light outputs of the solid light sources 20 at higher accuracy so as to improve the performance of the deep dimming and the color adjustment.

Figure 3:
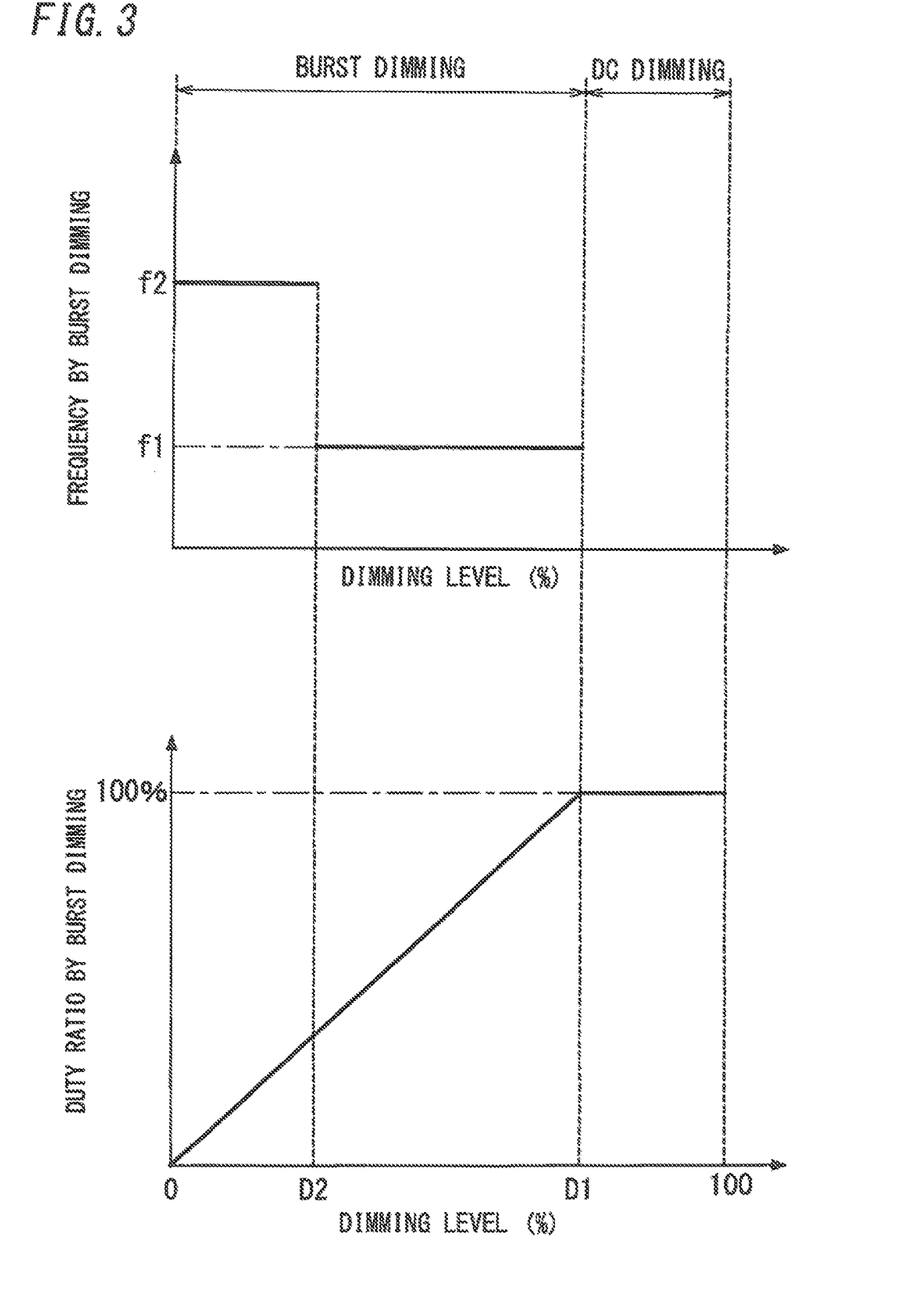
FIG. 3 is a correlation diagram of a frequency by burst dimming and a correlation diagram of a duty ratio by burst dimming, with respect to a dimming level contained in a dimming signal to the lighting device.

As shown in an example of FIG. 3, when the dimming level (%) is in a range between 100 and D1, the lighting device 10 performs the DC dimming but does not perform the burst dimming. When the dimming level (%) is in a range between D1 and D2 (a threshold level D2 or more), the lighting device 10 performs the burst dimming. Even when the dimming level (%) is in a range between D2 and 0 (below the threshold level D2), the lighting device 10 performs the burst dimming. Preferably, when the dimming level (%) is below the threshold level D2, the lighting device 10 (the processor 3b) is configured (, through the signal modulators 3d,) to set each second frequency f2 to a given fixed frequency and to vary a duty ratio by the burst dimming with respect to each first switching device 2c according to the dimming level.

Thus, the lighting device 10 has a comparatively simple configuration in which each second frequency f2 is set to the given fixed frequency and each duty ratio by the burst dimming is varied according to the dimming level, thereby capable of adjusting the light outputs of the solid light sources 20 at a lower luminous flux.

Figure 4:
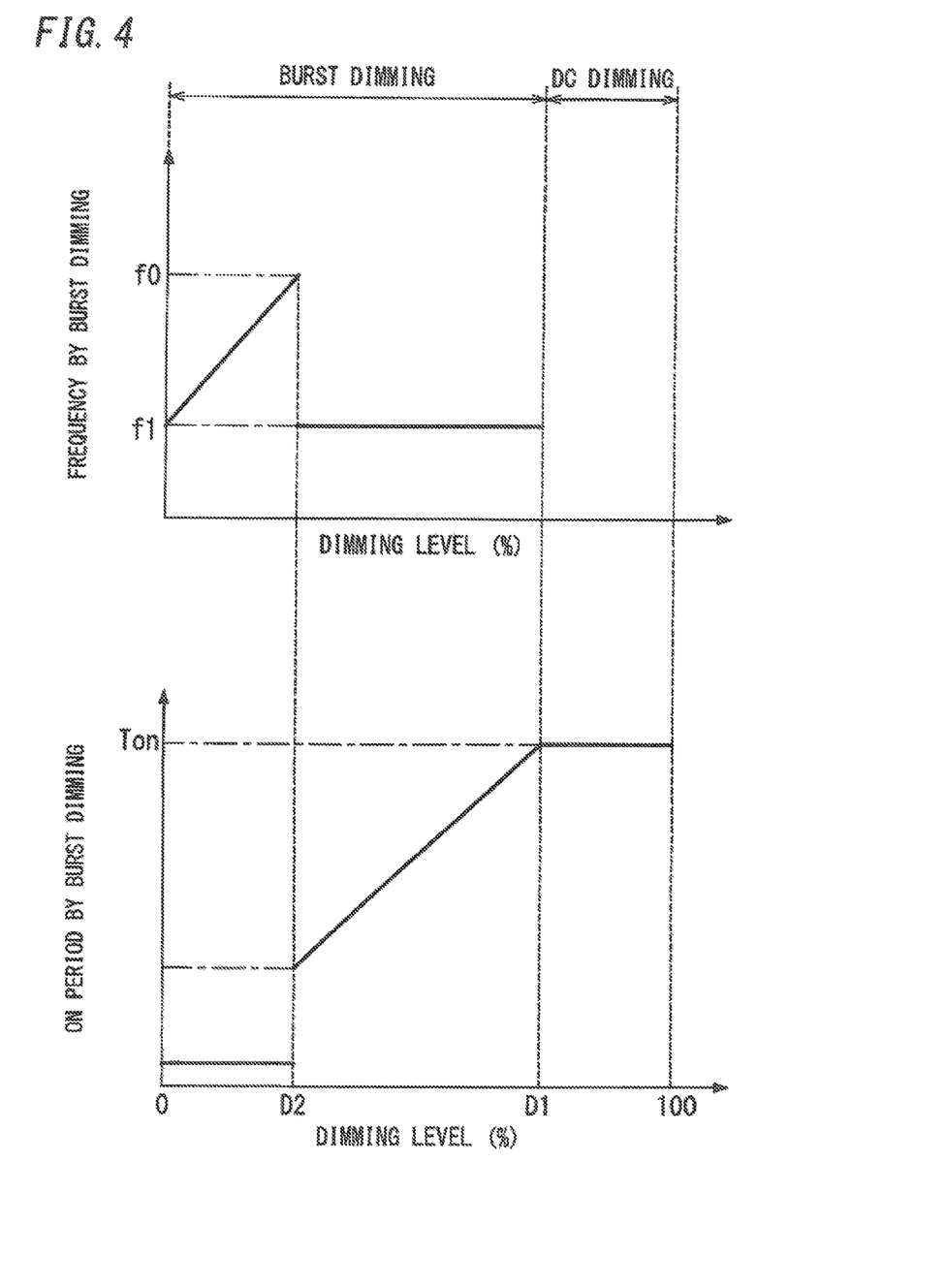
FIG. 4 is a correlation diagram of a frequency by burst dimming and a correlation diagram of an ON period by burst dimming, with respect to a dimming level contained in a dimming signal to a lighting device as Modified Example 1 of Embodiment 1.

The lighting device 10 is not limited to the dimming control shown in FIG. 3, but may be configured to perform dimming control as shown in Modified Example 1 of FIG. 4. Preferably, the signal modulators 3d (that operate according to control by the processor 3b) is configured, when the dimming level (%) is below the threshold level D2, to vary the second frequency f2 according to the dimming level with an ON period by the burst dimming with respect to each first switching device 2c maintained at a given fixed period. In the example of FIG. 4, according to the dimming level, the lighting device 10 (the signal modulators 3d) varies the second frequency f2 in a range between a given third frequency f0 higher than the first frequency f1 and the first frequency f1.

The lighting device 10 sets the ON period by the burst dimming to a given fixed period, and varies the second frequency f2 according to the dimming level, thereby capable of adjusting the light outputs of the solid light sources 20 at a lower luminous flux.

Figure 5:
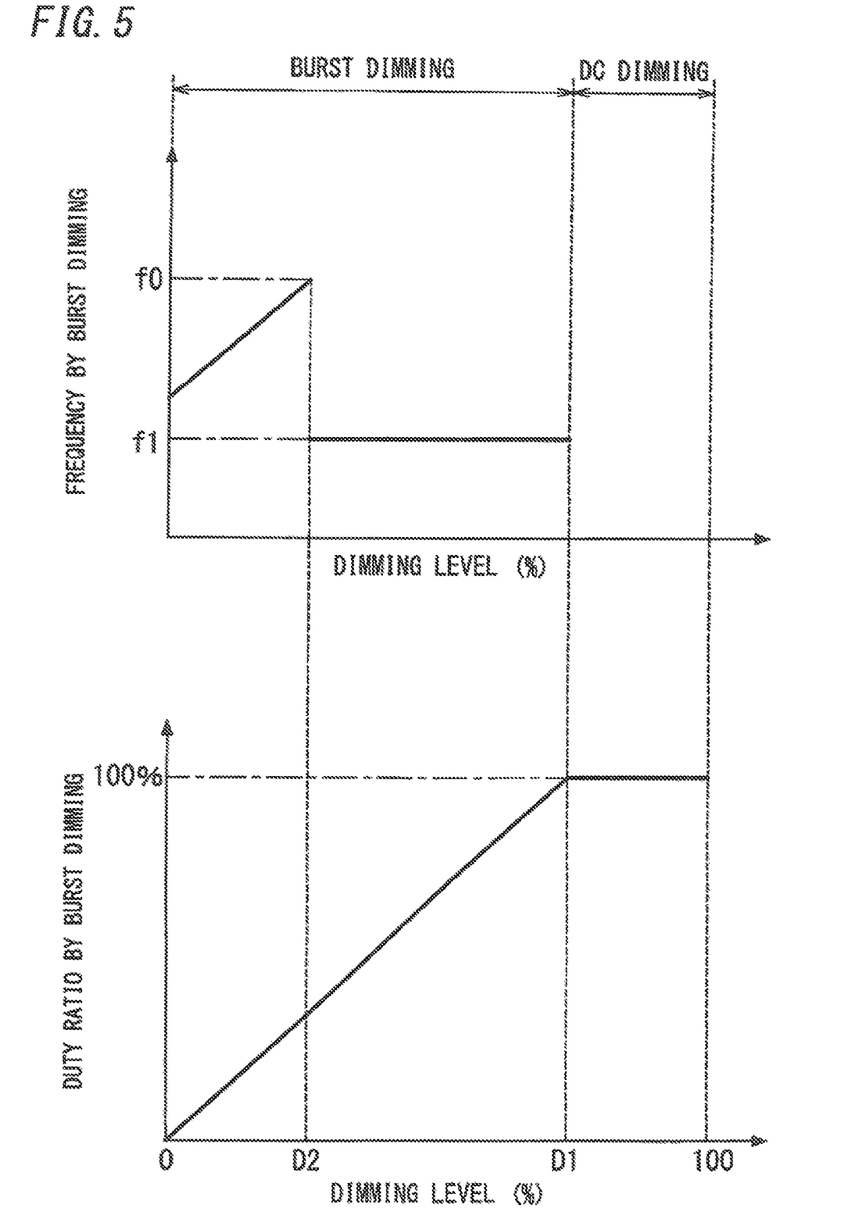
FIG. 5 is a correlation diagram of a frequency by burst dimming and a correlation diagram of a duty ratio by burst dimming, with respect to a dimming level contained in a dimming signal to a lighting device as Modified Example 2 of Embodiment 1.

The lighting device 10 is not limited to dimming control shown in FIG. 3 or 4, but may be configured to perform dimming control as shown in Modified Example 2 of FIG. 5. Preferably, as shown in FIG. 5, the lighting device 10 (the signal modulators 3d that operate according to control by the processor 3b) is configured, when the dimming level (%) is below the threshold level D2, to vary both a second frequency f2 and a duty ratio (an ON duty) by the burst dimming with respect to each first switching device 2c, according to the dimming level. In the example of FIG. 5, according to the dimming level, the lighting device 10 (the signal modulators 3d) varies the second frequency f2 in a range between a given third frequency f0 higher than the first frequency f1 and the first frequency f1.

The lighting device 10 varies both the second frequency f2 and the duty ratio (the ON duty) by the burst dimming according to the dimming level, thereby capable of adjusting the light outputs of the solid light sources 20 at a lower luminous flux and at higher accuracy.

Embodiment 2

Figure 8:
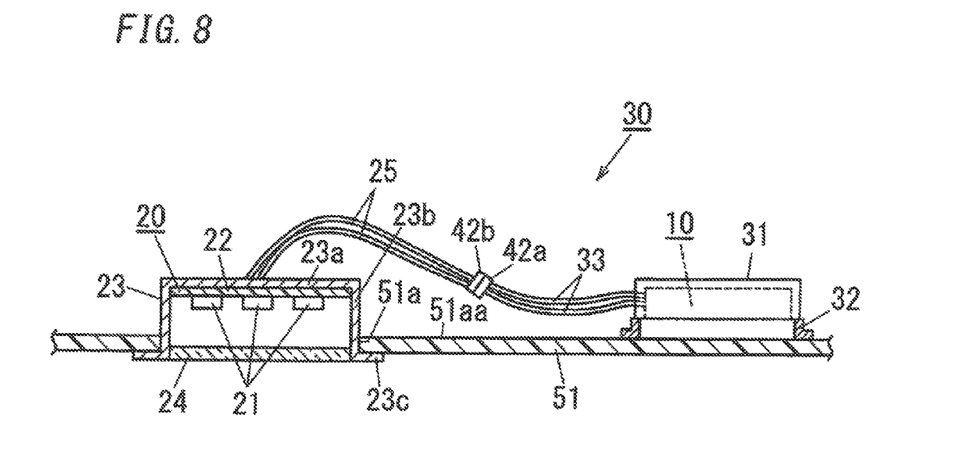
FIG. 8 is a view illustrating a lighting fixture, in accordance with Embodiment 2.

As shown in FIG. 8, a lighting fixture 30 according to the embodiment includes the lighting device 10 of Embodiment 1. Like kind elements are assigned the same reference numerals as depicted in Embodiment 1, and description thereof has been omitted as appropriate. Sizes and positional relations of elements shown in the figure may be exaggerated for the purpose of clarity. In the explanation below, elements constituting the embodiment may include one member as two or more elements, which functions as the two or more elements, and two or more elements sharing a function of one element.

As shown in FIG. 8, the lighting fixture 30 of the embodiment includes the lighting device 10 and a solid light source(s) 20.

The lighting fixture 30 of the embodiment may include the lighting device 10 configured to adjust the light output of the solid light source 20 at a lower luminous flux. In the case where the lighting fixture 30 includes one solid light source 20, the lighting device 10 includes one second power supply circuit 7.

Hereinafter, an example of the lighting fixture 30 of the embodiment will be explained in detail.

In an example of FIG. 8, the lighting device 10 of the lighting fixture 30 is housed in a case 31. The solid light source 20 of the lighting fixture 30 is installed in a fixture body 23. The lighting fixture 30 (specifically, the solid light source 20) is recessed in, for example, a ceiling member 51. The lighting fixture 30 is a lighting fixture with a separate power supply and configured so that the lighting device 10 is provided separately from the solid light source 20. Thus, since the lighting fixture 30 is the lighting fixture with the separate power supply, the fixture body 23 can be reduced in thickness. With the separate power supply, it is possible to increase degree-of-freedom of installation location of the solid light source 20.

The lighting fixture 30 is not limited to a configuration of the separate power supply. The lighting fixture 30 may be integrally formed of the lighting device 10 and the solid light source 20.

In the example of FIG. 8, an LED module of the solid light source 20 includes a plurality of LED devices 21 and a mount substrate 22. For example, the mount substrate 22 has an appearance shaped like a flat circle. The plurality of LED devices 21 is mounted on a surface of the mount substrate 22. A wiring pattern (a conductor pattern) is provided on the surface of the mount substrate 22. The wiring pattern may be formed of copper foil or the like. The plurality of LED devices 21 is electrically connected through the wiring pattern of the mount substrate 22. The wiring pattern of the mount substrate 22 is electrically connected with a first connection cable 25 for power supply. The mount substrate 22 may be a ceramic substrate. The mount substrate 22 is not limited to the ceramic substrate, but may be, for example, a metal-based printed circuit board, a glass epoxy board or the like.

The fixture body 23 includes a bottom wall 23a shaped like a disc and a side wall 23b shaped like a hollow cylinder. The fixture body 23 is shaped like a hollow cylinder with a bottom by the bottom wall 23a and the side wall 23b. The mount substrate 22 is attached on an inner face of the bottom wall 23a of the fixture body 23. Since the mount substrate 22 is attached on the bottom wall 23a of the fixture body 23, an adhesive sheet having electric insulation and thermal conductivity may be provided between the mount substrate 22 and the bottom wall 23a. A lead-out hole (not shown) is cut in the bottom wall 23a. The first connection cable 25 is extended from the lead-out hole of the fixture body 23. The first connection cable 25 includes a first connector 42b on an end thereof extended outward from the lead-out hole. A flange 23c is provided on an opening end of the side wall 23b and is protruded sideways. The side wall 23b may be provided with mounting brackets (not shown). In this case, a periphery of the ceiling member 51 around an embedding-hole 51a cut in the ceiling member 51 can be sandwiched between the flange 23c and the mounting brackets. Material examples of the fixture body 23 include metal such as iron, aluminum and stainless steel, and resin. As stated above, the periphery of the ceiling member 51 around the embedding-hole 51a is sandwiched between the flange 23c and the mounting brackets, whereby the fixture body 23 can be recessed in the ceiling member 51.

In the example of FIG. 8, the fixture body 23 includes a protective panel 24. The protective panel 24 is shaped like a disc. The protective panel 24 covers an opening of the fixture body 23. The protective panel 24 has optically-transparency. The protective panel 24 is configured to diffuse respective light to be emitted outward from the plurality of LED devices 21. Material examples of the protective panel 24 include acrylic resin, glass and the like. In the lighting fixture 30, the protective panel 24 is detachably attached to the opening end of the side wall 23b of the fixture body 23.

In the example of FIG. 8, the case 31 is shaped like a rectangular case. The lighting device 10 is housed in the case 31. The case 31 can be arranged on a surface 51aa of the ceiling member 51. The case 31 includes a spacer(s) 32 that keeps a specified distance between the case 31 and the ceiling member 51. The case 31 is provided with a hole that is cut in a side wall of the case 31. A second connection cable 33 is extended from the hole of the case 31. The second connection cable 33 includes a second connector 42a on an end thereof extended outward from the hole. The second connection cable 33 is electrically connected with the lighting device 10. The case 31 may be formed of aluminum die-casting. Material of the case 31 is not limited to aluminum, but may be metal material such as iron, copper or stainless steel, or resin material.

In the lighting fixture 30 of the embodiment, the lighting device 10 is electrically connected with the dimmer controller 41. Therefore, the lighting fixture 30 can adjust a light output of the solid light source 20 according to a dimming signal from the dimmer controller 41.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A lighting device, comprising:
   an electricity storage that has a variable electricity storage capacity and is configured to be electrically connected in parallel with a solid light source;
   a switching circuit that is configured to produce a current to supply the current to the electricity storage; and
   a control circuit that is configured to receive a dimming level for adjusting a light output of the solid light source and to control, according to the dimming level, burst dimming by controlling the switching circuit so that the solid light source is lit intermittently, the control circuit comprises:
      an electricity storage controller that is configured to vary an electricity storage capacity of the electricity storage, the electricity storage controller being configured to set the electricity storage capacity of the electricity storage to a first capacity when the dimming level is a predetermined threshold level or more, and to set the electricity storage capacity of the electricity storage to a second capacity smaller than the first capacity when the dimming level is below the threshold level; and
      a signal modulator that is configured to vary a frequency by the burst dimming with respect to the switching circuit, the signal modulator being configured to set the frequency by the burst dimming to a first frequency when the dimming level is the threshold level or more, and to set the frequency by the burst dimming to a second frequency higher than the first frequency when the dimming level is below the threshold level.

2. The lighting device of claim 1, wherein the signal modulator is configured, when the dimming level is below the threshold level, to vary a duty ratio by the burst dimming according to the dimming level while maintaining the second frequency at a given fixed frequency.

3. The lighting device of claim 1, wherein the signal modulator is configured, when the dimming level is below the threshold level, to vary the second frequency according to the dimming level while maintaining an ON period by the burst dimming at a given fixed period.

4. The lighting device of claim 1, wherein the signal modulator is configured, when the dimming level is below the threshold level, to vary both the second frequency and a duty ratio by the burst dimming according to the dimming level.

5. A lighting fixture, comprising:
   a solid light source; and
   a lighting device, comprising:
      an electricity storage that has a variable electricity storage capacity and is configured to be electrically connected in parallel with the solid light source;
      a switching circuit that is configured to produce a current to supply the current to the electricity storage; and
      a control circuit that is configured to receive a dimming level for adjusting a light output of the solid light source and to control, according to the dimming level, burst dimming by controlling the switching circuit so that the solid light source is lit intermittently, the control circuit comprises:
         an electricity storage controller that is configured to vary an electricity storage capacity of the electricity storage, the electricity storage controller being configured to set the electricity storage capacity of the electricity storage to a first capacity when the dimming level is a predetermined threshold level or more, and to set the electricity storage capacity of the electricity storage to a second capacity smaller than the first capacity when the dimming level is below the threshold level; and
         a signal modulator that is configured to vary a frequency by the burst dimming with respect to the switching circuit, the signal modulator being configured to set the frequency by the burst dimming to a first frequency when the dimming level is the threshold level or more, and to set the frequency by the burst dimming to a second frequency higher than the first frequency when the dimming level is below the threshold level.

6. The lighting fixture of claim 5, wherein the signal modulator is configured, when the dimming level is below the threshold level, to vary a duty ratio by the burst dimming according to the dimming level while maintaining the second frequency at a given fixed frequency.

7. The lighting fixture of claim 5, wherein the signal modulator is configured, when the dimming level is below the threshold level, to vary the second frequency according to the dimming level while maintaining an ON period by the burst dimming at a given fixed period.

8. The lighting fixture of claim 5, wherein the signal modulator is configured, when the dimming level is below the threshold level, to vary both the second frequency and a duty ratio by the burst dimming according to the dimming level.

9. A lighting system, comprising:
a lighting device, comprising:
an electricity storage that has a variable electricity storage capacity and is configured to be electrically connected in parallel with a solid light source;
a switching circuit that is configured to produce a current to supply the current to the electricity storage; and
a control circuit that is configured to receive a dimming level for adjusting a light output of the solid light source and to control, according to the dimming level, burst dimming by controlling the switching circuit so that the solid light source is lit intermittently, the control circuit comprises:
an electricity storage controller that is configured to vary an electricity storage capacity of the electricity storage, the electricity storage controller being configured to set the electricity storage capacity of the electricity storage to a first capacity when the dimming level is a predetermined threshold level or more, and to set the electricity storage capacity of the electricity storage to a second capacity smaller than the first capacity when the dimming level is below the threshold level; and
a signal modulator that is configured to vary a frequency by the burst dimming with respect to the switching circuit, the signal modulator being configured to set the frequency by the burst dimming to a first frequency when the dimming level is the threshold level or more, and to set the frequency by the burst dimming to a second frequency higher than the first frequency when the dimming level is below the threshold level; and
a controller that is configured to transmit a dimming signal containing information on the dimming level to the lighting device.

10. The lighting device of claim 9, wherein the signal modulator is configured, when the dimming level is below the threshold level, to vary a duty ratio by the burst dimming according to the dimming level while maintaining the second frequency at a given fixed frequency.

11. The lighting device of claim 9, wherein the signal modulator is configured, when the dimming level is below the threshold level, to vary the second frequency according to the dimming level while maintaining an ON period by the burst dimming at a given fixed period.

12. The lighting device of claim 9, wherein the signal modulator is configured, when the dimming level is below the threshold level, to vary both the second frequency and a duty ratio by the burst dimming according to the dimming level.

* * * * *